US007487056B2

(12) United States Patent
Tashev

(10) Patent No.: US 7,487,056 B2
(45) Date of Patent: *Feb. 3, 2009

(54) PRECISION OF LOCALIZATION ESTIMATES

(75) Inventor: Ivan Tashev, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/210,160

(22) Filed: Aug. 22, 2005

(65) Prior Publication Data

US 2005/0283328 A1    Dec. 22, 2005

Related U.S. Application Data

(63) Continuation of application No. 10/791,252, filed on Mar. 1, 2004, now Pat. No. 6,970,796.

(51) Int. Cl.
| | | |
|---|---|---|
| G06F 19/00 | (2006.01) | |
| G01J 5/10 | (2006.01) | |
| G01S 3/02 | (2006.01) | |
| G06K 9/00 | (2006.01) | |

(52) U.S. Cl. .................. 702/94; 342/450; 382/103; 702/127

(58) Field of Classification Search ............. 702/85, 702/94, 95, 127, 150, 188; 342/450; 382/128, 382/239, 243, 284, 103; 414/788.1; 435/6
See application file for complete search history.

(56) References Cited

U.S. PATENT DOCUMENTS

| 5,555,512 A | * | 9/1996 | Imai et al. ................ 702/127 |
| 6,249,252 B1 | * | 6/2001 | Dupray ...................... 342/450 |
| 6,766,035 B1 | * | 7/2004 | Gutta ......................... 382/103 |
| 6,970,796 B2 | * | 11/2005 | Tashev ......................... 702/94 |

FOREIGN PATENT DOCUMENTS

| JP | 9-21863 | 1/1997 |
| JP | 2001-313992 A | 11/2001 |
| JP | 2003-270034 A | 9/2003 |
| JP | 2003-533140 A | 11/2003 |

\* cited by examiner

*Primary Examiner*—John Barlow
*Assistant Examiner*—John Le
(74) *Attorney, Agent, or Firm*—Lyon & Harr, LLP; Mark A. Watson

(57) ABSTRACT

Precision and reliability of localization estimates derived from conventional localization systems are improved through a system and method for post-processing of initial localization data, even in environments which may include noise, reflections, or other interference. Such localization systems include conventional sound source localization (SSL) systems based on microphone array inputs, radio source location systems based on directional antenna array inputs, etc. In general, this post-processing system and method applies statistical real-time clustering to initial localization estimates, and then uses this real-time clustering in a multi-stage process to generate new localization estimates having improved precision and reliability relative to the initial localization estimates.

20 Claims, 3 Drawing Sheets

PRECISION OF LOCALIZATION ESTIMATES

CROSS REFERENCE TO RELATED APPLICATIONS

This application is a Continuation Application of U.S. patent application Ser. No. 10/791,252, filed on Mar. 1, 2004 now U.S. Pat. No. 6,970,796, by Ivan Tashev, and entitled "A SYSTEM AND METHOD FOR IMPROVING THE PRECISION OF LOCALIZATION ESTIMATES," and claims priority to U.S. patent application Ser. No. 10/791,252 under Title 35, United States Code, Section 120.

BACKGROUND

1. Technical Field

The invention is related to object localization and tracking within a prescribed search area, and in particular, to a system and process for improving the precision of localization estimates generated by use of a receiving array, such as, for example, microphone arrays, directional antenna arrays, radar receiver arrays, etc., by providing cluster-based statistical post-processing of initial localization measurements or estimates.

2. Background Art

Localization and tracking of objects within prescribed regions is an important element of many systems. For example, a number of conventional audio conferencing applications use microphone arrays with conventional sound source localization (SSL) processing (i.e., time-delay estimates, beamsteering, etc.) to enable the speech or sound of particular individuals to be effectively isolated and processed as desired. Similar techniques have used arrays of directional antennas for locating radio sources for a number of applications, such as, for example, for determining which node or nodes are to be used by particular subscribers within in a wireless computer network. Still other similar techniques have been used for tracking objects using radar or laser receiver arrays. In general, such techniques are well known to those skilled in the art.

For example, conventional microphone arrays typically include an arrangement of microphones in some predetermined layout. These microphones are generally used to capture sound waves from various directions and originating from different points in space. One of a number of conventional techniques is then used to perform SSL. In general, these SSL techniques fall into two categories, including those based on time delay estimates (TDE), and those based on beamsteering. Finding the direction to a sound source plays an important role in spatial filtering, i.e. pointing a beam to the sound source and suppressing any noises coming from other directions. In some cases the direction to the sound source is used for speaker tracking and post-processing of recorded audio signals. In the context of a video conferencing system, speaker tracking is often used for dynamically directing a video camera toward the person speaking.

In general, most sound source localization systems process the signals from a microphone array by first preprocessing each signal from each microphone of the array. This preprocessing typically includes packaging the signal in frames, performing noise suppression, and classifying individual frames for determining whether particular frames will be processed or rejected for the purposes of determining the location of the sound source.

Once the preprocessing is complete, the actual sound source localization typically involves the use of conventional SSL techniques including, for example, TDE or beamsteering techniques, to provide either initial direction estimates or a probability distribution function (PDF) for indicating where a sound source is located. This location can be defined in terms of one-dimensional localization (i.e., the angle along which the sound source is located in a plane), two-dimensional localization (i.e., two angles, direction and elevation, for defining a vector representing the direction of the sound source in a three dimensional space), and full three-dimensional localization (i.e., direction, elevation and distance, for locating a point in a three-dimensional space at which the sound source is located). In general, whichever SSL technique is used, the goal is typically to provide robustness to reverberation, the ability to distinguish multiple sound sources, and high location precision in potentially noisy environments.

Once an indicator of the sound source location has been computed, a post-processing phase is often implemented. In general, this post-processing combines the results of several localization measurements to increase the precision, to follow the sound source movements, or to track multiple sound sources. Various conventional techniques used for SSL post-processing include simple averaging, statistical processing, Kalman filtering, particle filtering, etc. Such techniques are typically application dependent, but are generally directed at removing localizations from reverberated waves and strong reflections, and to improve sound source localization precision. In general, as the precision of the localization estimates or measurements increases, any further processing of the audio signal (such as, for example, accurate sound source tracking) is enhanced.

Signal source or object localization with respect to other signal types, including radio signals, radar waves, etc., is often accomplished using pre-and post-processing techniques similar to those described above for the case of sound waves captured via a microphone array. In general, such localization techniques often include beamsteering techniques adapted for different signal and receiver array types (e.g., directional antenna arrays, radar or laser receiver arrays, etc.). As with audio signals, localization of other signal types is typically based on analysis of the propagation of signals (e.g., sound waves, radio waves, radar wave reflections, etc.).

With all such localization systems, regardless of signal or array type, one primary goal is to provide fast and precise localization estimates or measurements, even in the presence of noise and other effects, such as diffraction, interference, reflection, etc., which tend to decrease localization precision and reliability.

As noted above, post-processing of localization estimates is generally designed to increase the precision of localization estimates. Therefore, what is needed is a system and process for providing fast and reliable post-processing of localization data for improving the precision of localization estimates. Further, such a system and method should be operable with and adaptable for existing localization techniques.

SUMMARY

A system and method as described herein operates to enhance existing signal localization techniques for tracking or locating one or more objects or signal sources by improving reliability and precision of initial localization estimates derived from conventional localization techniques. Note that throughout the following discussion, the term "object" will be used to refer either to actual objects being tracked or located via localization methods, or to signal sources (such as sound from a person talking). Conventional localization techniques that are improved through use of the post-processing techniques include, for example, conventional sound source localization (SSL) systems based on microphone array inputs, conventional radio source location systems based on directional antenna array inputs, conventional target location and tracking systems based on radar or laser receiver arrays, etc. Note that such localization techniques are well known to those skilled in the art, and will not be described in detail herein.

In general, the post-processing system and method described herein applies statistical real-time clustering process to initial localization estimates, and then uses this real-time clustering to generate new localization estimates having improved precision and reliability relative to the initial localization estimates. As noted above, the post-processing techniques described herein are adaptable for use with conventional systems that provide signal source localization estimates. Further, the system and method described herein has also been observed to provide improved precision and reliability where initial object localization estimates are gathered in environments which may include noise, reflections, reverberations, or other interference.

In particular, the process described herein begins by collecting, generating, or otherwise acquiring initial object localization estimates or measurements using any of a number of conventional localization techniques. In general, conventional localization data is typically provided in one, two, or three dimensions (e.g., direction; direction and angle; or direction, angle and distance) as a function of time. While the post-processing techniques described herein may be generalized to localization data of any dimensionality, for purposes of explanation the following discussion will assume that the localization data is three-dimensional, i.e., direction, elevation and distance within a prescribed region, along with known or computed standard deviations for direction, elevation and distance, $\sigma_\phi$, $\sigma_\theta$, and $\sigma_\rho$, respectively.

In addition to simply providing position estimates, conventional localization techniques frequently provide weight or confidence measures or estimates for describing a computed or estimated reliability for each localization estimate. Further, a time for each localization estimate is also typically provided. This time will be referred to hereinafter as a "time stamp" for each localization estimate. All of this information is used in the post-processing system and method described herein for increasing the precision and reliability of the initial localization estimates.

In other words, the post-processing system described herein takes an input of conventional localization estimates, with each localization estimate comprising: 1) positional data; 2) estimated positional reliability; and 3) a data time stamp. This data is then used to derive new localization estimates having improved reliability relative to the input localization estimates. This set of information (i.e., position, reliability, and time) for each initial localization estimate will be referred to throughout this description as "initial localization estimates," or simply as "initial measurements."

Reliability of positional or localization estimates is assumed to decrease as time passes, especially where object motion, or receiving array motion, is possible. Therefore, in one embodiment, given the initial localization estimates, the post-processing system and method described herein begins by first discarding all localization measurements older than a predetermined time. This predetermined time, or measurement "lifetime," is the time during which any particular localization estimate will be considered valid, and therefore, during which the localization estimate will be used for post-processing computations. This "lifetime" is simply a measure of the time since a particular localization estimate was generated (i.e., the time between the time stamp of the particular localization estimate and the current time).

In general, as the lifetime increases, more localization estimates will be available for post-processing. Typically, given a larger lifetime, the larger number of localization estimates available allows for a more reliable distinction to be made between real objects and possible reflections, thereby providing a better localization precision. However, use of a larger initial localization estimate lifetime also results in longer localization response times when an object moves or otherwise changes position relative to a receiving array. Therefore, optimal selection of localization estimate lifetime is made as a function of expected object motion. For example, given stationary or slow moving objects, longer lifetimes are typically appropriate. Conversely, shorter lifetimes are typically more appropriate for faster object motions. Consequently, in one embodiment, an adaptive lifetime is computed based on computed object motions, with the lifetime being chosen as a tradeoff between response time and position validity as a function of time. The computed motions are simply computed using position estimates as a function of time.

As described in further detail herein, the post-processing then continues with a multi-stage process, including: 1) "clustering" the initial localization estimates (those within the predetermined life-time) in spatially spread overlapping sections; 2) identifying "potential objects" within the clusters; 3) estimating the position and standard deviation of the potential objects based on the clustering; and 4) eliminating likely duplicate objects. In one embodiment, the post-processing further continues by computing a confidence level for the position estimate for each object (after elimination of duplicate objects). Consequently, the final result of the post-processing system and method described herein is a list of objects, each presented with location, standard deviation, and in one embodiment, the confidence level of the object location.

In view of the above summary, it is clear that the post-processing techniques described herein provide an improved system and process for improving the precision of localization estimates derived from conventional localization techniques. In addition to the just described benefits, other advantages of this system and method will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
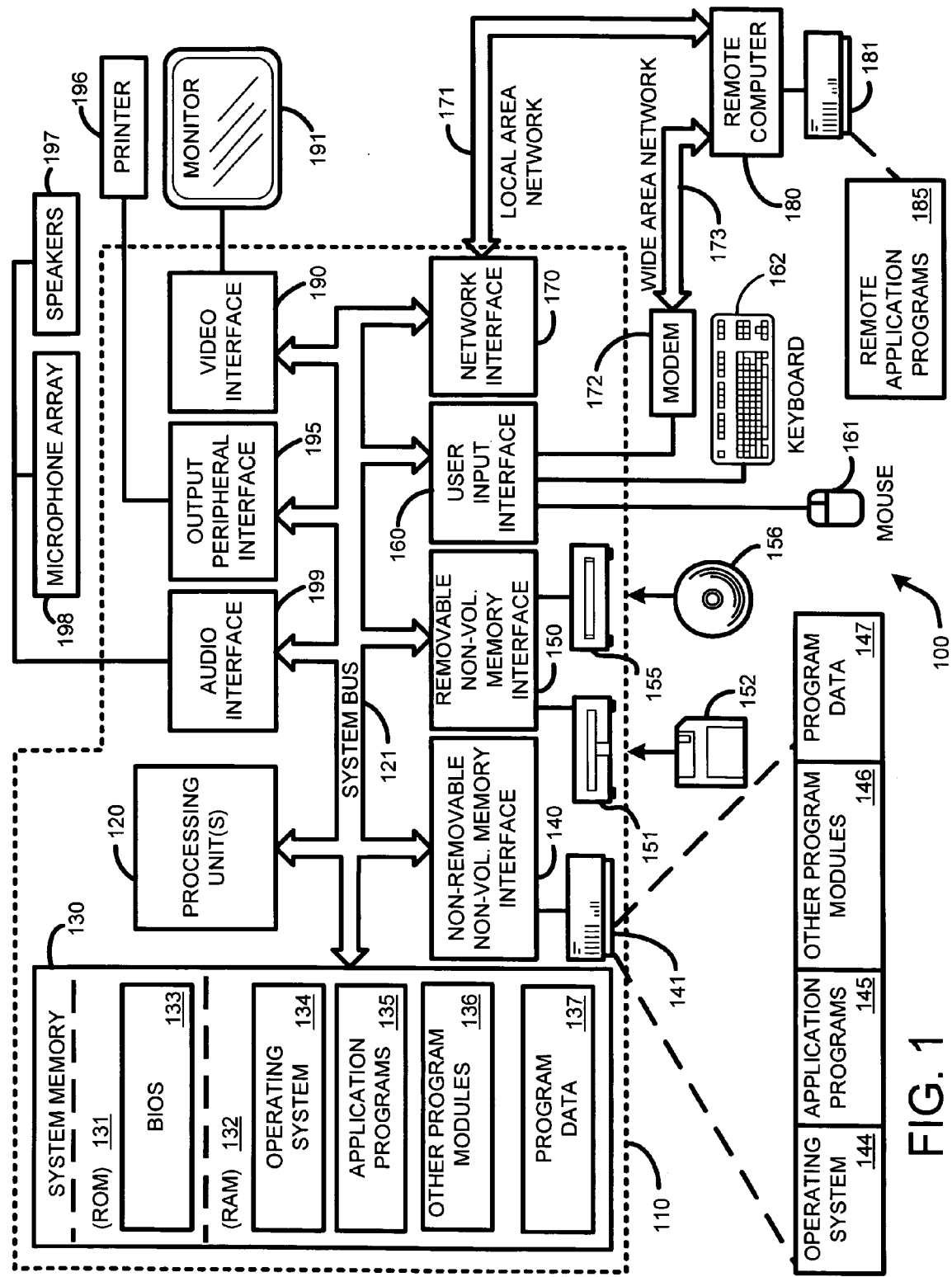
FIG. 1 is a general system diagram depicting a general-purpose computing device constituting an exemplary system for post-processing of initial localization data to generate new localization estimates having improved precision and reliability.

1.0 Exemplary Operating Environment:

FIG. 1 illustrates an example of a suitable computing system environment 100 with which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198, or other receiver array (not shown), such as, for example, a directional radio antenna array, a radar receiver array, etc. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. Still further input devices (not shown) may include receiving arrays or signal input devices, such as, for example, a directional radio antenna array, a radar receiver array, etc. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of a system and method for automatically improving the reliability and precision of object localization estimates derived from one or more receiving arrays.

2.0 Introduction:

A system and method as described herein operates to enhance existing signal localization techniques for tracking or locating one or more objects or signal sources by improving reliability and precision of initial localization estimates derived from conventional localization techniques. Note that throughout the following discussion, the term "object" will be used to refer either to actual objects being tracked or located via localization methods, or to signal sources (such as sound from a person talking, radio sources, radar reflections, etc.). Localization techniques that are improved through use of the post-processing techniques include, for example, conventional sound source localization (SSL) systems based on microphone array inputs, conventional radio source location systems based on directional antenna array inputs, conventional target location and tracking systems based on radar or laser receiver arrays, etc. Note that such localization techniques are well known to those skilled in the art, and will not be described in detail herein.

In general, the post-processing system and method described herein applies statistical real-time clustering process to initial localization estimates, and then uses this real-time clustering to generate new localization estimates having improved precision and reliability relative to the initial localization estimates. As noted above, the post-processing techniques described herein are adaptable for use with conventional systems that provide signal source localization estimates. Further, the system and method described herein has also been observed to provide improved precision and reliability where initial object localization estimates are gathered in environments which may include noise, reflections, reverberations, or other interference.

2.1 System Overview:

The system and method described herein for post-processing of localization estimates begins by collecting, generating, or otherwise acquiring initial object localization estimates or measurements using any of a number of conventional localization techniques. In general, conventional localization data is typically provided in one, two, or three dimensions (e.g., direction; direction and angle; or direction, angle and distance) as a function of time. While the post-processing techniques described herein may be generalized to localization data of any dimensionality, for purposes of explanation the following discussion will assume that the localization data is three-dimensional, i.e., direction, elevation and distance within a prescribed region, along with known or computed standard deviations for direction, elevation and distance, $\sigma_\phi$, $\sigma_\theta$, and $\sigma_\rho$, respectively.

In addition to simply providing position estimates, conventional localization techniques frequently provide weight or confidence measures or estimates for describing a computed or estimated reliability for each localization estimate. Further, a time for each localization estimate is also typically provided. This time will be referred to hereinafter as a "time stamp" for each localization estimate. All of this information is used in the post-processing system and method described herein for increasing the precision and reliability of the initial localization estimates.

In other words, the post-processing system described herein takes an input of conventional localization estimates, with each localization estimate comprising: 1) positional data; 2) estimated positional reliability; and 3) a data time stamp. This data is then used to derive new localization estimates having improved reliability relative to the input localization estimates. This set of information (i.e., position, reliability, and time) for each initial localization estimate will be referred to throughout this description as "initial localization estimates," or simply as "initial measurements."

Reliability of positional or localization estimates is assumed to decrease as time passes, especially where object motion, or receiving array motion, is possible. Therefore, in one embodiment, given the initial localization estimates, the post-processing system and method described herein begins by first discarding all localization measurements older than a predetermined time. This predetermined time, or measurement "lifetime," is the time during which any particular localization estimate will be considered valid, and therefore, during which the localization estimate will be used for post-processing computations. This "lifetime" is simply a measure of the time since a particular localization estimate was generated (i.e., the time between the time stamp of the particular localization estimate and the current time).

In general, as the lifetime increases, more localization estimates will be available for post-processing. Typically, given a larger lifetime, the larger number of localization estimates available allows for a more reliable distinction to be made between real objects and possible reflections, thereby providing a better localization precision. However, use of a larger initial localization estimate lifetime also results in longer localization response times when an object moves or otherwise changes position relative to a receiving array. Therefore, optimal selection of localization estimate lifetime is made as a function of expected object motion. For example, given stationary or slow moving objects, longer lifetimes are typically appropriate. Conversely, shorter lifetimes are typically more appropriate for faster object motions. Consequently, in one embodiment, an adaptive lifetime is computed based on computed object motions, with the lifetime being chosen as a tradeoff between response time and position validity as a function of time. The computed motions are simply computed using position estimates as a function of time.

As described in further detail herein, the post-processing then continues with a multi-stage process, including: 1) "clustering" the initial localization estimates (those within the predetermined life-time) in spatially spread overlapping sections; 2) identifying "potential objects" within the clusters; 3) estimating the position and standard deviation of the potential objects based on the clustering; and 4) eliminating likely duplicate objects. In one embodiment, the post-processing further continues by computing a confidence level for the position estimate for each object (after elimination of duplicate objects). Consequently, the final result of the post-processing system and method described herein is a list of objects, each presented with location, standard deviation, and in one embodiment, the confidence level of the object location.

Figure 2:
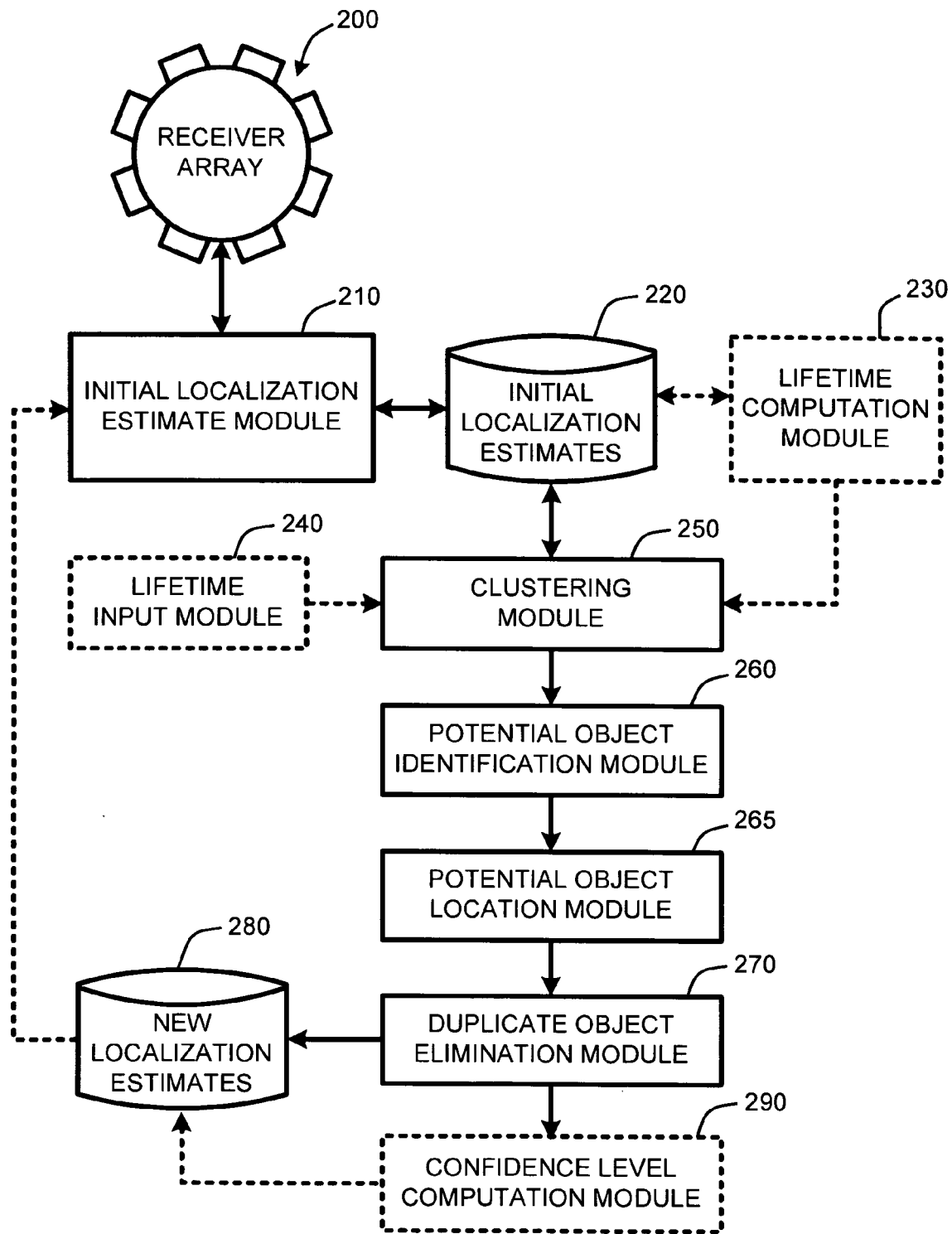
FIG. 2 illustrates an exemplary system diagram showing exemplary program modules for implementing a post-processor for post-processing of initial localization data to generate new localization estimates having improved precision and reliability.

2.2 System Architecture:

The processes summarized above are illustrated by the general system diagram of FIG. 2. In particular, the system diagram of FIG. 2 illustrates the interrelationships between program modules for implementing a system and method for post-processing of initial localization estimates for improving the precision and reliability of those localization estimates. This system and method will generally be referred to below as a "post-processor." It should be noted that any boxes and interconnections between boxes that are represented by broken or dashed lines in FIG. 2 represent alternate embodiments of the post-processor described herein, and that any or all of these alternate embodiments, as described below, may be used in combination with other alternate embodiments that are described throughout this document.

In general, the post-processor operates to improve initial localization estimates 220 derived from a conventional receiver array 200 and a conventional initial localization estimate module 210. As noted above, the receiver array 200 is any conventional receiving array, such as, for example, a microphone array, a directional antenna array, a radar array, a laser receiver array, etc. In addition, the receiver array 200 may also be a single receiver which acts in a manner similar to an array of receivers. For example, a single rotating receiver, such as a rotating radar receiver, will acquire signals from various directions about the axis of rotation. In this manner, the radar receiver acts in a manner similar to a radar array by receiving signals from various directions as it rotates. However, while localization estimates from such receivers are compatible with the post-processor described herein, it should be noted that single receiver systems (as opposed to actual arrays) tend to have longer response times for providing localization estimates.

The initial localization estimate module 210 is a conventional localization or tracking system for providing localization estimates from signals or inputs received from the receiver array 200. For example, in the case of a microphone array, the initial localization estimate module 210 is a conventional sound source localization (SSL) system. Note that for purposes of explanation, the following discussion will continue to use a conventional microphone array as the receiver array 200, and an SSL system as the initial localization estimate module 210. However, in view of the detailed description of the post-processor provided herein, it should be understood that the post-processor is operable with any of a number of conventional localization systems, and is not limited to merely improving the precision and reliability of localization estimates provided by a conventional microphone array/SSL system.

Once the initial localization estimates 220 have been provided by the initial localization estimate module 210, the post-processor uses a clustering module 250 for real-time clustering of the initial localization estimates 220 in spatially spread overlapping sections. Note that this real-time clustering process with spatially spread overlapping sections is described in detail below in Section 3.2.1. As noted above, in one embodiment, only those estimates whose lifetimes have not yet expired are processed via the real-time clustering process. Localization estimates whose lifetimes have expired are simply discarded with respect to the post-processing described herein.

In one embodiment, a lifetime computation module 230 automatically computes optimized localization estimate lifetimes based on computed object motions. For example, because the initial localization estimates 220 include a time stamp indicating the time each localization estimate was generated, it is a simple matter to compute approximate object motions as a function of time. Given these object motions, the lifetime computation module 230 then determines an appropriate lifetime for localization estimates for each object. As noted above, these lifetimes are dependent upon the motion of particular objects. However, the lifetimes are also dependent upon the type of receiver array 200 and localization system being used.

For example, in a tested embodiment, localization estimate lifetimes on the order of about 4 seconds was observed to provide good results for microphone arrays in combination with SSL for tracking persons speaking in the work volume covered by the microphone array. Similarly, in another tested embodiment, lifetimes on the order of about 2 seconds was observed to provide good results for identifying which directional antenna in an antenna array to use for receiving particular nodes in a wireless computer network. In each case, the lifetime computation module 230 then automatically adjusts the localization estimate lifetimes up or down by some small amount to account for computed object motions, with the goal being to provide a lifetime that ensures that the localization estimates are not so old as to be relatively unreliable. Further, in the case of multiple objects, each object may then have a different localization estimate lifetime, dependant upon the motion of each particular object.

In another embodiment, rather than computing localization estimate lifetimes for particular systems, a lifetime input module 240 is used to provide a constant lifetime to be used for all initial localization estimates 220. Again, the length of the lifetime should be dependent upon the type of receiver array 200, the type of localization system being used, and expected object motions.

Once the clustering module 250 has completed the clustering of localization estimates, a potential object identification module 260 then identifies clusters of localization estimates representing potential objects within each spatially spread overlapping section through a statistical analysis of the localization estimate clusters. In general, potential objects are identified in these overlapping sections by using a threshold for identifying those sections which contain one or more objects. As described in detail below in Section 3.2.2, if a computed average weight of any section with a non zero number of measurements exceeds a predetermined threshold, than it is assumed that there is a potential object in that section, and it is selected for further processing.

A potential object localization module 265 then computes a position for each potential object from the localization estimates comprising each cluster. At this point, the position of potential objects represents a refinement of the initial localization estimates 220. However, as a result of using overlapping sections, particular localization estimates or measurements may exist in two or more neighboring sections. Note that the computation of potential object positions is described in further detail below in Section 3.2.3.

Therefore, the next step uses a duplicate object elimination module 270 to eliminate duplications of identified objects resulting from the use of overlapping sections. In general, after the object identification module has analyzed the clusters of localization estimates, there is a list of hypothetical or potential objects, each represented by position, standard deviation and weight. However, because of the use of overlapping sections, there are often duplications in this list, hence the use of the term "potential objects." In general, as described in detail below in Section 3.2.4, duplications are deemed to exist if the distance between any two hypothetical objects is less than a threshold distance. Where duplicates are deemed to exist, the duplicate object elimination module simply removes the potential object having a lower weight from the list. In the unlikely case of equal weights, one of the potential objects is simply randomly eliminated. Any remaining potential objects are then simply provided as the new localization estimates 280.

In another embodiment, a confidence level computation module 290 then computes a confidence level or measure for each of the new localization estimates 280. Computation of this confidence level is described below in further detail in Section 3.2.5.

Finally, in yet another embodiment, the new localization estimates are provided back to the initial localization estimate module 210 for use in generating new initial localization estimates 220. The use of existing localization estimates for initializing localization computations is well known to those skilled in the art, and will not be described in detail herein.

3.0 Operation Overview:

The above-described program modules are employed for implementing the post-processor described herein. As summarized above, this post-processor system and method automatically improves the precision and reliability of localization estimates through multi-stage post-processing of input localization data. The following sections provide a detailed operational discussion of exemplary methods for implementing the aforementioned program modules.

3.1 Collecting Initial Localization Results:

As noted above, the post-processor described herein is applicable to many different localization techniques. For example, the post processing system and method described herein operates to improve sound source localization (SSL) results in audio systems using microphone arrays. Similarly, the post processing system and method described herein also operates to improve localization of radio signals, such as, for example, to select particular directional antennas in an antenna array for use with computer endpoints in a wireless computer network. Other examples include radar and laser tracking systems. All such systems will be referred to collectively below as a "source localizer."

Regardless of what type of localization system is being used, it is assumed that, in the case of three dimensional localization data, that each localization measurement includes: 1) an object location, represented by direction, elevation and distance; 2) a weight which provides an indication of how much the source localizer trusts this measurement; and 3) a time stamp which indicates the time of each localization measurement.

As noted above, the actual algorithm used by the localizer for generating the initial localization estimates doesn't really mater, as long as it provides the information noted above (i.e., object location, weight, and time). After each successful measurement the initial localization estimates are collected by a post-processor input queue. The post-processor then removes all measurements from the input queue that are older than a given lifetime T. As noted above, this lifetime is either automatically computed based on object motions, or predefined for particular localization systems. In general, using a larger lifetime means that more results are available for processing, thereby facilitating a more reliable distinction between real objects and reflections, and providing for better precision. However, as noted above, longer lifetimes result in larger response times when the object or signal source moves or changes position.

3.2 Post-Processing of Initial Localization Estimates:

Post-processing of the initial localization estimates involves a number of stages, including: clustering, finding potential objects (i.e., sound sources, radio sources, etc.), estimating positions of the potential objects, reduction or elimination of duplicate objects, and calculation of the confidence levels. These post-processing stages are described in the following Sections.

3.2.1 Clustering Initial Localization Estimates:

It is assumed that the work volume (i.e., the space or volume being monitored or served by the receiving array) is pre-defined or can be readily determined using conventional techniques. In particular, it is assumed that the following parameters are known with respect to the work volume:

minimum and maximum direction angles $\phi_{min}$ and $\phi_{max}$;

minimum and maximum elevation angle $\theta_{min}$ and $\theta_{max}$; and minimum and maximum distance $\rho_{min}$ and $\rho_{max}$.

Given these parameters, the work volume is automatically divided into a number, M, of overlapping regions or sections. Note that using regions of equal size is not necessary, but it serves to reduce computational complexity. Note that the section size depends on the precision of the initial estimator and shouldn't typically be larger than about four to six times the standard deviation, e.g., 6σ.

Alternately, in one embodiment, the number of overlapping regions or sections and amount of overlap is user definable. Any number or size of regions may be used. However, using more regions with smaller sizes tends to increase the precision of localization estimates, at the cost of increased computational overhead. In particular, the region size is the resolution of the post-processor to detect separate objects, assuming one object per cluster. The minimal size, however, depends on the precision of the initial estimator, where it is desired to have almost all measurements from one object to go to the same cluster. Therefore, for standard distributions this means that that a region size of approximately 6 times the standard deviation (e.g., 6σ) will capture about 99% of the measurements for the object. However, for particular purposes, the cluster or region size can be larger than 6σ.

In a tested embodiment involving a microphone array and sound source localization, the work volume was divided into M overlapping regions, each with a size six times the standard deviation in each dimension (i.e., direction, elevation, and distance). Choosing areas of this size, and allowing a 50% overlap between regions, gives the number of overlapping regions, in accordance with Equation (1), where:

$$M = 8 \frac{\varphi_{max} - \varphi_{min}}{6\sigma_\varphi} \cdot \frac{\theta_{max} - \theta_{min}}{6\sigma_\theta} \cdot \frac{\rho_{max} - \rho_{min}}{6\sigma_\rho} \quad \text{Equation (1)}$$

Note that in this tested embodiment, the 6's in the denominator of Equation (1) represent the use of region sizes of six times the standard deviation of the initial estimator. As noted above, other region sizes may be used to provide for the desired accuracy. However, it should be noted that a 6-sigma interval (e.g., ±3-sigma around the average) holds approximately 99% of the measurements. In addition, the number "8" in Equation (1) is a consequence of the amount of overlap between regions. In particular, because a 50% overlap was used in this example, the factor of "8" is simply results from "2×2×2=8" (e.g., 50% overlap in each of the three dimensions). In view of the preceding discussion, it should be clear that more overlapping means more clusters, and thus more duplicated objects, and consequently more computational overhead. However, less overlapping means that objects in the middle between the clusters may be missed. For a 6-sigma section width, it has been observed that the optimal overlapping is about 66%. This means that the overlapping region is 4 sigmas, which will hold approximately 80% of the measurements in the worst case. 50% overlapping was used in the tested embodiment simply to reduce computational overhead.

Once the number of regions is known, the work volume is then simply divided into that number of regions. Each initial localization estimate is then simply assigned to whatever regions of the work volume cover each initial localization estimate. Because each initialization estimate has an associated lifetime, multiple localization estimates are typically available for each object. Consequently, assigning localization estimates to particular regions results in the formation of localization estimate clusters within each region. Note that due to the use of overlapping regions, particular measurement may be assigned to two or more neighboring sections, depending upon the amount of overlap. As noted above, the use of larger regions of overlap results in better resolution for separate objects but increases the necessary computations.

3.2.2 Identifying Sections with Potential Objects:

Once the work volume has been divided into regions, and clusters of localization estimates formed as described above in Section 3.2.1, a determination is made as to which regions have potential objects within them. For example, if a particular region has no localization estimates, it is assumed that there are no objects within that particular region, so that region is then excluded from further processing so as to reduce computational overhead.

However, in another embodiment, determination of whether particular regions include one or more potential objects is accomplished using a weight-based threshold. In particular, in a tested embodiment, identifying those sections with potential objects was accomplished by first computing an average weight, $W_{th}$, of all sections with a non-zero number of measurements (i.e., at least one localization estimate was assigned to that particular region), which represents the weight-based threshold. $W_{th}$ then represents the threshold weight used to gauge each region of the work volume. Note that the threshold weight is computed using the original weights provided as part of the initial localization estimates. For example, one method for computing such weights is provided in Equation (2), as follows:

$$W_{th} = \frac{K}{L} \sum_{i=0}^{M-1} \sum_{j=0}^{N_i-1} W_{ij} \quad \text{Equation (2)}$$

where $W_{ij}$ is the original weight of j-th measurement in i-th section, $N_i$ is the number of measurements in i-th section, M is the number of sections, L is the number of sections with a non-zero number of measurements, and K is a constant.

Note that the value of K depends on the number of the sections and the number of false measurements (i.e., measurements in sections resulting from reflections and noise rather than real objects). In a tested embodiment, a value of K=2 was used so to ignore as false measurements in as many sections as possible. In particular, it has been observed that sections with false measurements typically contain about one to two measurements, as a result of reflections and noise. Using a value of K=2 allows the post-processor to ignore sections with very small numbers of measurements so that such measurements are not counted as potential objects. Note that the value of a K is application dependent, and for particular implementations of the post-processor, it may be desirable to avoid processing of sections with less than three measurements (or some other minimal number), depending on how many measurements are provided by the initial estimator as a function of time.

A total section weight for each section which represents the sum of the weights of all measurements in each particular section is then computed for each section, as illustrated by Equation (3):

$$W_i = \sum_{j=0}^{N_i-1} W_{ij} \qquad \text{Equation (3)}$$

If any section weight, $W_i$, is greater than the threshold weight, $W_{th}$, it is assumed that there is a potential object in that section, and it is flagged for further processing as described below.

3.2.3 Position Estimation Computations:

While position estimates can be computed for potential objects in all of the regions of the work volume, it is unlikely that there are actually any objects, or any localization estimates having high reliability, in regions that were not flagged in the previous step as having a weight exceeding the threshold, $W_{th}$. Consequently, in one embodiment, position estimates are only computed for potential objects within those regions having a weight which exceeds the threshold, $W_{th}$. In general, the position estimation provided during this stage of the post-processing involves a two-stage statistical processing approach.

In particular, for each section, the first stage computes a weighted averaging of all measurements in the section. In one embodiment, the speed of this statistical processing is increased by first converting each position, $p_{ij}$, to a rectangular coordinate system, as illustrated by Equation (4):

$$x_{ij} = \rho_{ij} \cos \phi_{ij} \cos \theta_{ij}$$

$$y_{ij} = \rho_{ij} \sin \phi_{ij} \cos \theta_{ij}$$

$$z_{ij} = \rho_{ij} \cos \theta_{ij} \qquad \text{Equation (4)}$$

The weighted average and weighted standard deviation are then calculated as illustrated by Equations (5) and (6), as follows:

$$p_i = \frac{1}{W_i} \sum_{j=0}^{N_i-1} W_{ij} \rho_{ij} \qquad \text{Equation (5)}$$

$$\sigma_i = \sqrt{\frac{\frac{1}{W_i} \sum_{j=0}^{N_i-1} W_{ij}(p_i - p_{ij})^2}{N_i - 1}} \qquad \text{Equation (6)}$$

where $p_i$ is the position of the object in this section, and $\sigma_i$ is the standard deviation of the object position estimate.

Due to the use of overlapping sections, and dependant upon the size of each sections, some of the localization measurements belonging to the same object might exist in two or more neighboring sections. Further, there may also be noise measurements existing in each such section. Therefore, in one embodiment, to eliminate these measurements, and to improve overall positional precision, a second pass of weighted averaging is performed for measurements within a particular distance of the computed object position, $p_i$.

In a tested embodiment, a weighted averaging of measurements in the range of $p_i \pm 2\sigma_i$ was used to obtain a final position estimate $\tilde{p}_i$ for each section. The number of measurements in the range of $p_i \pm 2\sigma_i$ is denoted as $\tilde{n}_i$. The weighted standard deviation $\tilde{\sigma}_i$ for $\tilde{p}_i$ is then recalculated for precision estimation as illustrated by Equation (7), as follows:

$$\tilde{\sigma}_i = \sqrt{\frac{\frac{1}{W_i} \sum_{j=0}^{\tilde{n}_i-1} W_{ij}(p_i - p_{ij})^2}{\tilde{n}_i(\tilde{n}_i - 1)}} \qquad (7)$$

Finally the sum of the weights $W_i$ of all position measurements in the range of $p_i \pm 2\sigma_i$ is computed for each potential object, $\tilde{p}_i$.

3.2.4 Reduction of Potential Objects:

At this point a list of hypothetical or potential objects has been generated, with each of these potential objects being represented by position, $\tilde{p}_i$, standard deviation, $\tilde{\sigma}_i$, and weight, $W_i$. The goal of this step is to eliminate duplications from the list. As noted above, duplications may exist due to the use of overlapping sections. In one embodiment, the criterion for determining whether any two objects are duplicates is based on a computed distance between any two or more hypothetical or potential objects. For example, if the distance between any two hypothetical objects k and l, where (k≠l), in all directions is less than the amount of section overlap in each direction, then these two objects are considered as actually representing the same object or signal source. Assuming a six sigma section width and 50% section overlap, the distances are simply computed as illustrated by Equation (8), as follows:

$$|x_k - x_l| \leq 3\sigma_\rho \cos \sigma_\phi \cos \sigma_\theta$$

$$|y_k - y_l| \leq 3\sigma_\rho \sin \sigma_\phi \cos \sigma_\theta$$

$$|z_k - z_l| \leq 3\sigma_\rho \sin \sigma_\theta \qquad (8)$$

Once it is determined that any two potential or hypothetical objects are actually the same object, the object having a lower weight, $W_i$, is simply removed, thereby reducing the total list of objects. At this point the list of objects represents a set of object localization measurements or position estimates having improved precision and reliability with respect to the initial localization estimates.

3.2.5 Calculation of Position Estimate Confidence Levels:

In one embodiment, the post-processing continues by computing confidence levels for each object position estimate generated during the post-processing stages described above. Typically, confidence levels are provided as a number in a range of 0 to 1, with 0 representing no confidence, and 1 representing full confidence. The factors affecting the computed confidence levels are the number of measurements $\tilde{n}_i$, the standard deviation $\tilde{\sigma}_i$ and the latest time stamp among these $\tilde{n}_i$ measurements.

In particular, when the number of measurements is less than a given number, $N_{crit}$, the confidence level decreases, thereby indicating less trustworthy position measurements. Note that the value of $N_{crit}$ depends on the desired reaction time, and upon how many initial measurements are provided by the initial estimator. For example, in a tested embodiment of an SSL system, the desired reaction time was 0.5 seconds, and the initial estimator provided approximately 10 measurements per second. Consequently, at least five measurements, i.e., $N_{crit}=5$, were needed to have a confidence of 1. Increasing $N_{crit}$ makes the confidence level slowly increase from the time someone begins to speak from a particular location. However, averaging and statistically processing less than about 5 to 10 measurements is not typically very reliable within the type of SSL system used in this tested embodiment.

Similarly, position measurements having larger standard deviations are also typically less trustworthy. Finally, when particular position measurements are based on older data, those position estimates are also typically less trustworthy. For example in a tested embodiment, the confidence level was decreased for objects as the age of the most recent measurement approached the measurement lifetime (see Sections 2.1 and 2.2 for a discussion of measurement lifetimes).

Therefore, in one embodiment, confidence levels were computed for each measurement by considering each of the above-mentioned factors. One such method for considering these factors to generate a position measurement confidence level is provided by Equation (9) and (10), as follows:

$$c_{iN} = \tilde{n}_i / N_{crit}$$

$$c_{i\phi} = \sigma_\phi / \Theta_\phi$$

$$c_{i\theta} = \sigma_\theta / \Theta_\theta$$

$$c_{i\rho} = \sigma_\rho / \Theta_\rho$$

$$c_{iT} = (t - T_{iLast})/(2T) \quad \text{Equation (9)}$$

where $c_{iN}$ is the confidence level based on the number of measurements; $c_{i\rho}$, $c_{i\theta}$ and $c_{i\rho}$ are the confidence levels based on the standard deviation; and $c_{iT}$ is the confidence level based on the last measurement time stamp $T_{iLast}$ where t is the current time and $T_L$ is the measurements lifetime. After limiting, or clipping, the values of the confidence level sub-levels shown in Equation (9) in the range between 0 and 1, the final confidence level is then calculated as illustrated by Equation (10), as follows:

$$c_i = c_{iN} c_{i\phi} c_{i\theta} c_{i\rho} c_{iT} \quad \text{Equation (10)}$$

where the final confidence level, $c_i$, will be between 0 and 1 by virtue of limiting each of the sub-confidence levels to this range.

The computed confidence levels for each measurement are then included along with the final result from the post-processor (described in Sections 3.2.1 through 3.2.4) to produce a list of objects, each presented with location, confidence level and standard deviation. As noted above, this list represents a refinement of the initial localization estimates and provides for more precise and reliable localization measurements or estimates relative to the initial localization estimates.

Figure 3:
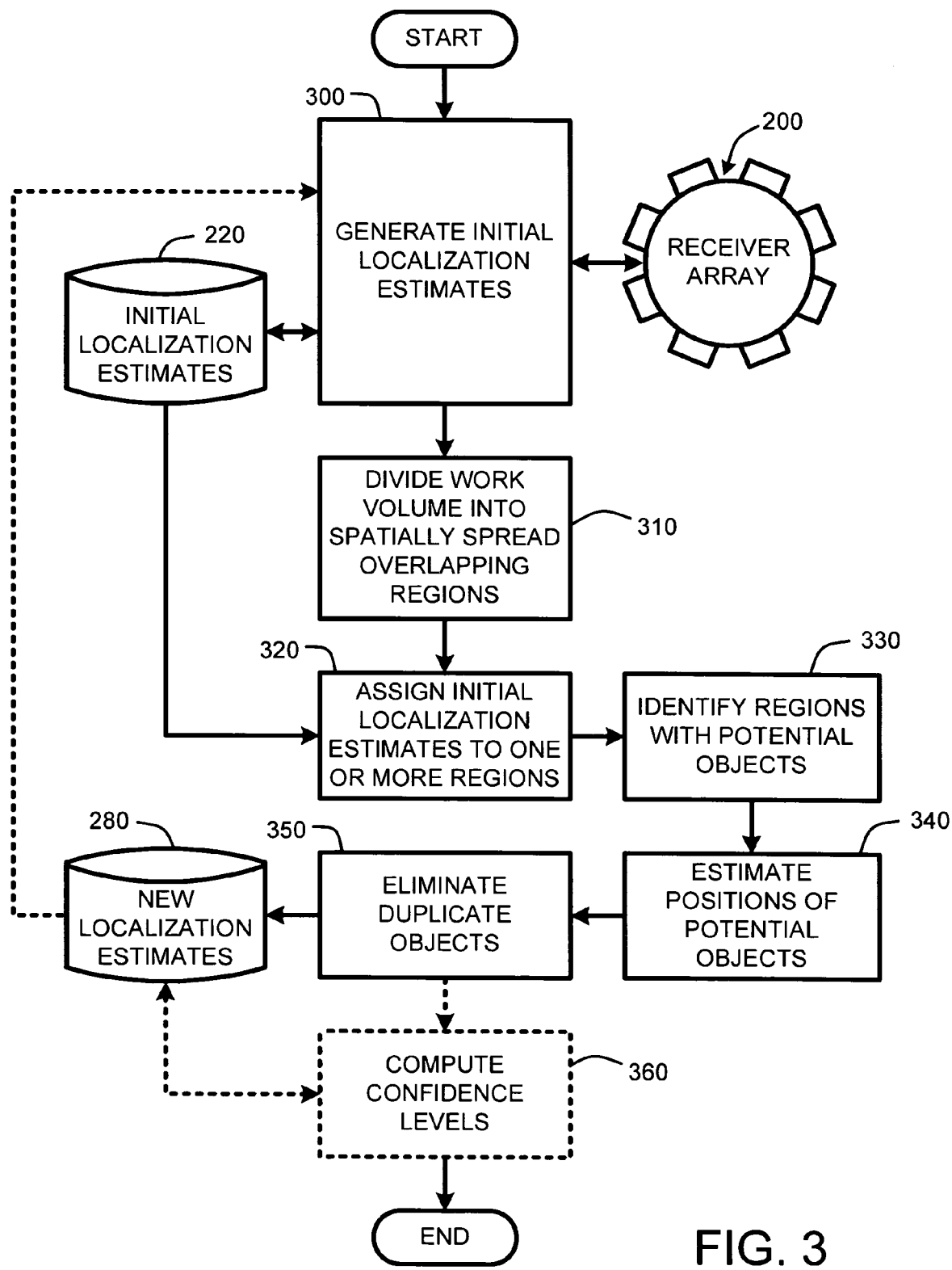
FIG. 3 provides an exemplary operational flow diagram which illustrates the operation of the post-processor of FIG. 2.

4.0 Post-Processor Operational Overview:

The processes described above with respect to FIG. 2, and in view of the detailed description provided in Sections 2 and 3 are illustrated by the general operational flow diagram of FIG. 3. In particular, FIG. 3 illustrates an exemplary operational flow diagram which illustrates operation of the post-processor. It should be noted that any boxes and interconnections between boxes that are represented by broken or dashed lines in FIG. 3 represent alternate embodiments of the post-processor described herein, and that any or all of these alternate embodiments, as described below, may be used in combination with other alternate embodiments that are described throughout this document.

In general, as illustrated by FIG. 3, post-processor operation begins by accepting an input of localization estimates 220 generated 300 using a conventional localization technique for producing positional measurements from a receiving array 200. As described above, these conventional localization techniques are well known to those skilled in the art, and include techniques, such as, for example, conventional SSL techniques for using a microphone array to localize sound sources within a work volume.

The work volume is then divided into a number of overlapping regions or segments 310. As described above in Section 3.2.1, in alternate embodiments the number of overlapping regions and amount of overlap used is either predefined, user definable, or automatically computed.

Next, each initial localization estimate 220 is then simply assigned 320 to corresponding regions of the work volume based on the position of each of those initial localization estimates. However, as described above, multiple localization estimates are typically available for each object. As a result, particular localization estimates may actually be assigned to two or more regions due to the use of region overlap. Assigning 320 these initial localization estimates to the various regions serves to form localization estimate clusters within one or more of the regions.

A statistical analysis of the clusters in each region is then used to determine which of the regions contain potential objects 330. The point of this step is simply to avoid performing unnecessary computations for those regions that do not contain potential objects. Thus, while this step is not essential, it does serve to provide a reduction in computational overhead for the post-processor.

Once the regions containing potential objects have been identified 330, the positions of each potential object are then estimated 340, again using a statistical analysis of the clusters representing each potential object within each region. These estimates positions are then used to determine whether any of the potential objects are duplicates. For example, because the regions overlap, and because particular measurements may therefore simultaneously exist in two or more regions, it is possible that particular objects can be identified as a potential object in more than one region. This issue is addressed by simply comparing the actual positions and weights computed for each potential object to eliminate 350 lower weight objects where a computed distance between potential objects indicates that two objects are actually the same object.

The remaining potential objects are then used to populate the list or set of new localization estimates 280, as described above. Further, in one embodiment, confidence levels are computed 360 for the position of each of the new localization estimates 280. In general, these confidence levels provide a measure of the reliability of the new localization estimates 280 based on a number of factors, including the number of measurements $\tilde{n}_i$ used in computing the new localization estimates 280, the computed standard deviation, $\sigma_i$, of each measurement, and the relative age of the data used to compute the new localization estimates 280.

Finally, in one embodiment, the new localization estimates 280 are provided as an input to the initial localization system which is used to generate 300 the initial localization estimates. For example, as is well known to those skilled in the art, the use of current or prior position information is often used as an initialization factor when computing localization estimates based on new observations provided from a receiver array 200, such as a microphone array or other device.

The foregoing description of the post-processor for automatically improving the precision and reliability of initial localization estimates has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any

What is claimed is

1. A system for automatically improving precision of initial localization estimates, comprising using a computing device to perform the following steps:
   generating an initial set of localization data comprising a plurality of localization estimates;
   dividing a work volume into a predetermined number of overlapping regions;
   assigning each localization estimate to any corresponding one or more of the overlapping regions to form one or more clusters of localization estimates in one or more of the overlapping regions;
   estimating positions of objects represented by each cluster of localization estimates;
   determining whether any of the objects are duplicate objects by comparing the estimated object positions for clusters in overlapping regions;
   eliminating each duplicate object; and
   providing each remaining estimated object position to populate a set of position estimates, said set of position estimates representing a set of improved localization estimates relative to the initial set of localization estimates, and wherein said set of position estimates is stored for later use by a user.

2. The system of claim 1 further comprising steps for computing a confidence level for each position estimate in the set of position estimates.

3. The system of claim 1 wherein a lifetime is associated with each localization estimate, and further comprising steps for excluding any localization estimate having an expired lifetime from the initial set of localization data.

4. The system of claim 3 further comprising steps for computing the lifetime as a function of estimated object motions.

5. The system of claim 3 wherein each cluster of localization estimates has a separate lifetime, and further comprising steps for computing the lifetime of each cluster as a function of estimated object motions.

6. The system of claim 1 further comprising steps for using the set of position estimates to initialize any subsequent estimating of positions of objects represented by each cluster of localization estimates.

7. The system of claim 1 wherein the number of overlapping regions is user definable.

8. The system of claim 1 wherein the amount of overlap is user definable.

9. The system of claim 1 further comprising steps for using a weight-based threshold to determine whether particular clusters actually represent objects prior to estimating positions of objects represented by each cluster of localization estimates.

10. A computer-implemented process for automatically generating a set of new position estimates from a set of initial position estimates, comprising steps for:
    forming one or more clusters of initial position estimates by assigning each initial position estimate in the set of initial position estimates to one or more corresponding overlapping regions covering a work volume being monitored by a receiving array;
    computing new position estimates from each cluster of initial position estimates;
    comparing the new position estimates from each cluster to determine whether any of the position estimates represent a position of a duplicate object;
    estimating new position estimates representing duplicate objects by discarding each new position estimates having a lower computed weight than a corresponding duplicate position estimate; and
    providing each remaining new position estimate to populate a set of new position estimates, said set of new position estimates being stored for later use by a user.

11. The computer-implemented process of claim 10 further comprising steps for automatically removing estimates older than a predetermined amount of time from the set of initial position estimates prior to forming clusters of initial position estimates.

12. The computer-implemented process of claim 11 further comprising steps for computing the predetermined amount of time as a function of estimated object motions generated from position estimates over time.

13. The computer-implemented process of claim 10 further comprising steps for computing a confidence level for each new position estimate used to populate the set of new position estimates.

14. The computer-implemented process of claim 10 wherein the number of overlapping regions and amount of overlap is user definable.

15. The computer-implemented process of claim 10 further comprising steps for computing new position estimates from each cluster of initial position estimates only for those clusters having a computed weight which exceeds a predetermined threshold.

16. A method for automatically increasing a reliability and precision of initial localization estimates derived from a receiving array, comprising:
    generating a set of initial localization estimates from an input received from a receiving array;
    dividing a work volume covered by the receiving array into a set of at least partially overlapping sections;
    assigning each initialization estimate to one or more of the overlapping sections to create one or more clusters of initial localization estimates within one or more of the overlapping sections;
    identifying any of the overlapping regions wherein clusters of the initial localization estimates represent potential objects;
    estimating positions of the potential objects in each overlapping region which includes a cluster representing a potential object;
    comparing each estimated position to determine whether any of the estimated positions represents a position of a duplicate potential object;
    eliminating estimated positions representing duplicate potential objects; and
    providing each remaining estimated position to a set of estimated positions representing new localization estimates having increased reliability and precision relative to the initial localization estimates, said set of estimated positions being stored for later use by a user.

17. The method of claim 16 further comprising computing a confidence level for each estimated position provided to the set of estimated positions.

18. The method of claim 16 wherein a lifetime is associated with each localization estimate, and wherein generating the set of initial localization estimates further comprises excluding any localization estimate whose current age is greater than the associated lifetime.

19. The method of claim 16 wherein the number of overlapping regions and amount of overlap is user definable.

20. The method of claim 16 wherein identifying any of the overlapping regions wherein clusters of the initial localization estimates represent potential objects further comprises:

computing a weight for each cluster;

comparing the weight to a predetermined weight threshold; and excluding any cluster whose weight is less than the predetermined weight threshold.

* * * * *